United States Patent [19]

Van Wandelen

[11] Patent Number: 4,494,876
[45] Date of Patent: Jan. 22, 1985

[54] INTEGRATOR FOR ANALYZING THE SPECTRAL CONTENT OF PRINTING ILLUMINATION

[75] Inventor: Henri Van Wandelen, Overland Park, Kans.

[73] Assignee: Bremson Data Systems, Inc., Lenexa, Kans.

[21] Appl. No.: 349,460

[22] Filed: Feb. 17, 1982

[51] Int. Cl.³ .............................................. G01J 3/50
[52] U.S. Cl. .................................... 356/404; 355/38
[58] Field of Search ..................... 356/404, 73; 355/38

[56] References Cited

U.S. PATENT DOCUMENTS

| | | | |
|---|---|---|---|
| 3,359,851 | 12/1967 | Lipschutz et al. | 356/404 |
| 3,418,048 | 12/1968 | Veit | 355/38 |
| 3,507,574 | 4/1970 | Crete | 355/38 |
| 3,601,485 | 8/1971 | Barbieri | 355/38 |
| 4,050,808 | 9/1977 | Gyori | 355/38 |
| 4,068,943 | 1/1978 | Gyori | 355/38 |
| 4,124,292 | 11/1978 | Van Wandelen | 355/37 |
| 4,214,171 | 7/1980 | Gyori | 307/39 |
| 4,371,259 | 2/1983 | Howitt | 355/38 |

*Primary Examiner*—F. L. Evans
*Attorney, Agent, or Firm*—Litman, Day & McMahon

[57] ABSTRACT

An integrator for spectral analysis of printing illumination from photographic film including a lens for collimating the printing illumination into a beam. The integrator includes first and second color separation filters which divert respective colors from the beam. First and second phototransducers are provided for receiving the respective colors. A third phototransducer receives the beam passing through the first and second filters. Each phototransducer produces a signal representative of the intensity of the respective color.

24 Claims, 6 Drawing Figures

INTEGRATOR FOR ANALYZING THE SPECTRAL CONTENT OF PRINTING ILLUMINATION

BACKGROUND OF THE INVENTION

1. Field of the Invention

This invention relates to photographic enlarging and printing and in particular to an integrator for spectral analysis of printing illumination from photographic film.

2. Description of the Prior Art

In the field of color photography, color correction of photographic film (including negatives and positive transparencies) is generally required to produce pleasing and realistic prints. Such correction is necessitated by such factors as imperfections in the photographic medium, variations in photographic processing, subject matter and the manner in which the photograph was taken. Corrections are achieved by varying the spectral content, (i.e. the amounts of blue, red, and green light) of the printing illumination. These variations cause corresponding changes in the cyan, magenta and yellow images respectively produced in the emulsion layers of the color printing paper.

Experience has shown that most color photographs have aggregate chromatic values which fall within certain "population centers" within a gray portion of a color spectrum. Occasionally photographs will appear having aggregate chromatic values outside these population centers, for example, a photograph primarily containing blue sky or water. Computer programs utilized in conjunction with color printing processes may be set to print most photographs within the population centers and yet accomodate those having aggregate primary colors outside the gray range of the spectrum. A variety of apparatus are well known for producing such variations in the spectral content of the printing illumination. For example, in a subtractive system, color filters are provided for passing desired amounts of light in selected color bands from a common strong white light source. A desired color composition is achieved by combining light from the respective filters.

Another type of light source, exemplified by my U.S. Pat. No. 4,124,292 is generally referred to as an additive lamp system. In an additive system, a plurality of lamps each producing one of the primary colors are employed. The output of each lamp is individually controlled to achieve light of proper composition which is mixed, for example in a mixing chamber, for application to the photographic film.

Another type of subtractive light source utilizes interference filters which are placed in the beam of a single light source, such as that from an enlarger lens, at successive predetermined times. The color dyes in the print paper emulsion thus receive proper amounts of exposure for realistic color images in the resulting print.

Regardless of the type of light source utilized with an enlarger or printer, means must be provided for analyzing the spectral content of the photographic film illumination to determine the proper color composition for printing. The photographic film illumination is generally defined by four parameters corresponding to the density (i.e., lightness or darkness) and the amounts of blue, red and green light in the printing illumination passing through the film. The parameters may be expressed in, for example, numeric values. The resulting numeric values may be either read by an operator who then manually sets the light source for a desired color composition or may be received by a computer coupled to the light source for automatically performing this function. With respect to the density parameter, subject classifiers are available for analyzing this value of the negative.

For analyzing the spectral content of the printing illumination, it is known to utilize a video analyzer which projects a color image on a screen for overall color evaluation whereby the inputs for the light source may be determined by an operator. For example, a cathode ray tube or a flying spot scanner may be utilized to illuminate a color negative and obtain a spectral analysis thereon. However, such video analyzers are relatively complex and expensive and require attendance by an operator.

Spot analyzers may also be employed which check the spectral content of a particular part of the film, for example a person's face. Such analyzers are most useful in conjunction with portraits and are not well adapted for use with other types of photographs.

Total analyzing is a method of integration wherein the entire color spectrum of a negative is considered. One type of apparatus employed therewith has spectrally distinct photocells which respond to discreet primary colors within the printing illumination from the film. Such systems are also referred to as "integration to gray" systems because the light source is set to produce a printing illumination falling within a predetermined "population center" on the color spectrum wherein the total color composition has a gray value. Such photocells may be mounted in photo multiplier tubes which are radially arranged around an enlarger lens to receive the printing light from illuminated film for analysis.

However, such photocell and tube systems have a significant drawback in that they require significant amounts of space. In particular, the space limitations present difficulties when relatively small negatives (e.g., eleven millimeter film) are to be printed at a relatively large size, such as eight inches by ten inches. In such applications, the printer lens is very close to the film, whereby photocell multiplier tube systems are generally precluded by the space limitations. Further, such systems comprise a relatively complex array of photocells and tubes, necessitating a relatively high cost.

Heretofore, there has not been available an integrator with the advantages of photocell tubes at substantially less cost and adaptable to both enlargers and printers and compatible with various sizes of films and prints.

SUMMARY OF THE INVENTION

In the practice of the present invention, an integrator for an enlarger is provided which receives unfocused printing illumination directly from the enlarger lens, collimates it, and separates the collimated light beam into spectrally distinct light which energizes photoelectric sensors. The signals generated by the photoelectric sensors are amplified and fed to a computer which compares their relative intensities and establishes a proper color composition for a light source.

The integrator is movably mounted on the enlarger, whereby it may be swung into and out of the optical path of the printing illumination from the enlarger lens. The integrator moves up and down with the enlarger lens, and is thereby always readily positioned for spectral analysis of the printing illumination.

In an alternative embodiment, the integrator of the present invention is mounted in proximity to a printer and receives a substantially complete image of an exposure on the photographic film from a printing illumination mirror positioned adjacent the printer lens. The modified embodiment is particularly well adapted for use in conjunction with eleven millimeter negatives, wherein the space between the printer lens and the negative is relatively small when large prints are to be made.

The principal objects of the present invention are: to provide an integrator adaptable for use with color enlargers and printers; to provide such an integrator which receives illumination from a total photographic film exposure; to provide such an integrator which provides total integration (integration to gray) in conjunction with a computer; to provide such an integrator which requires relatively little space; to provide such an integrator which does not interfere with the operation of an enlarger or printer; to provide such an integrator which is compatible with enlargers and printers processing a variety of different sized films and prints; to provide such an integrator which is particularly well adapted for use with eleven millimeter negatives and relatively large prints thereof; to provide such an integrator which receives a concentrated, unfocused and relatively strong light beam from an enlarger lens; to provide such an integrator which receives a reflected image of illuminated film in a printer; to provide such an integrator which is adaptable for use in conjunction with a density classifier; to provide such an integrator which is adapted for use in conjunction with a computer operably controlling an enlarger or printer light source; to provide such an integrator compatible with additive, subtractive and interference filter type light sources; and to provide such an interference printer which is economical to manufacture, efficient in use, capable of a long operating life and particularly well adapted for the proposed use thereof.

Other objects and advantages of this invention will become apparent from the following description taken in conjunction with the accompanying drawings wherein are set forth, by way of illustration and example, certain embodiments of this invention.

The drawings constitute a part of this specification and include exemplary embodiments of the present invention and illustrate various objects and features thereof.

DESCRIPTION OF THE PREFERRED EMBODIMENTS

As required, detailed embodiments of the present invention are disclosed herein, however, it is to be understood that the disclosed embodiments are merely exemplary of the invention which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Figure 1:
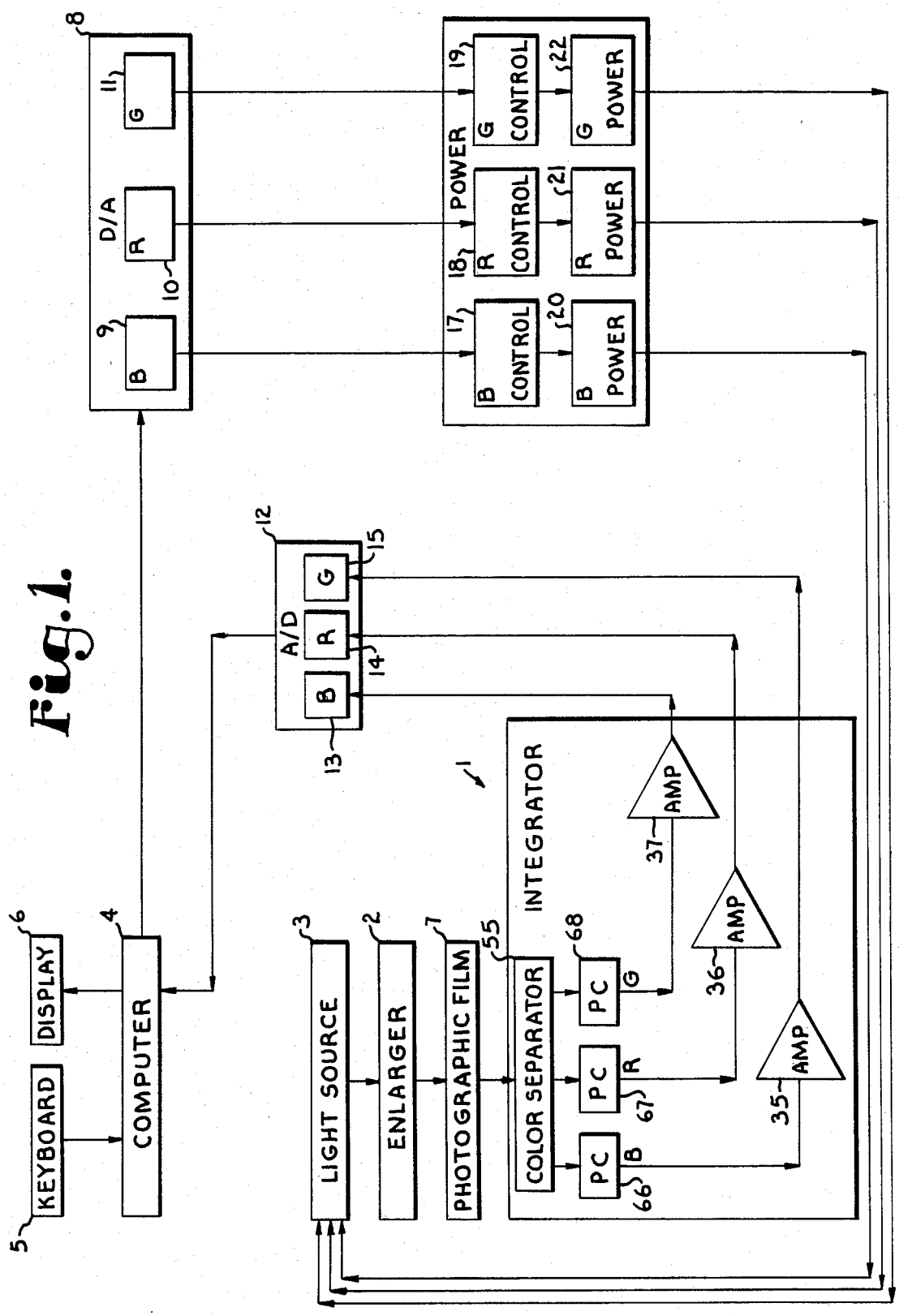
FIG. 1 is is schematic view of a color printing system including an integrator embodying the present invention.

Referring to the drawings in more detail, the reference numeral 1 generally designates an integrator for spectral analysis of printing illumination and includes a color separator 55 and blue, red and green photocells 32, 33 and 34 respectively, as will be described more fully hereinafter. The photocells 32, 33 and 34 are operably connected to amplifiers 35, 36 and 37 for amplifying the signals therefrom. As shown schematically in FIG. 1, the integrator 1 may be utilized in a printing system including an enlarger 2 for exposures on photographic film 7 (either a negative or a positive transparency) and a light source 3. The light source 3 may be, for example, of the additive type shown in my U.S. Pat. No. 4,124,292. Alternatively, the light source may be a subtractive type system or of the type utilizing interference filters applied to the printing illumination for predetermined time intervals.

A computer 4 provides overall control for the printing system and receives inputs relating to chromatic values and parameters from an operator by means of a keyboard 5. A display 6 is provided for monitoring the performance of the system and data relating thereto.

A digital to analog converter (D/A) 8 receives digital information and converts it to an amplitude; i.e. analog, type of signal representative of the printing illumination levels of the primary colors. The digital to analog converter 8 includes separate conversion circuit elements 9, 10 and 11 respectively for the blue, red and green primary color channels. Commands from the microprocessor 4 are relayed by the digital to analog converter 8 to blue, red and green controls 17, 18 and 19 for blue, red and green power sources 20, 21 and 22 respectively for the corresponding lamps in the light source 3.

An analog to digital (A/D) converter 12 similarly converts amplitude (analog) signals corresponding to sepctral content of the printing ilumination from the integrator 1 to digital signals for input to the microprocessor 4. The analog to digital converter 12 also includes separate conversion circuit elements 13, 14 and 15 respectively for the blue, red and green primary color channels.

Figure 2:
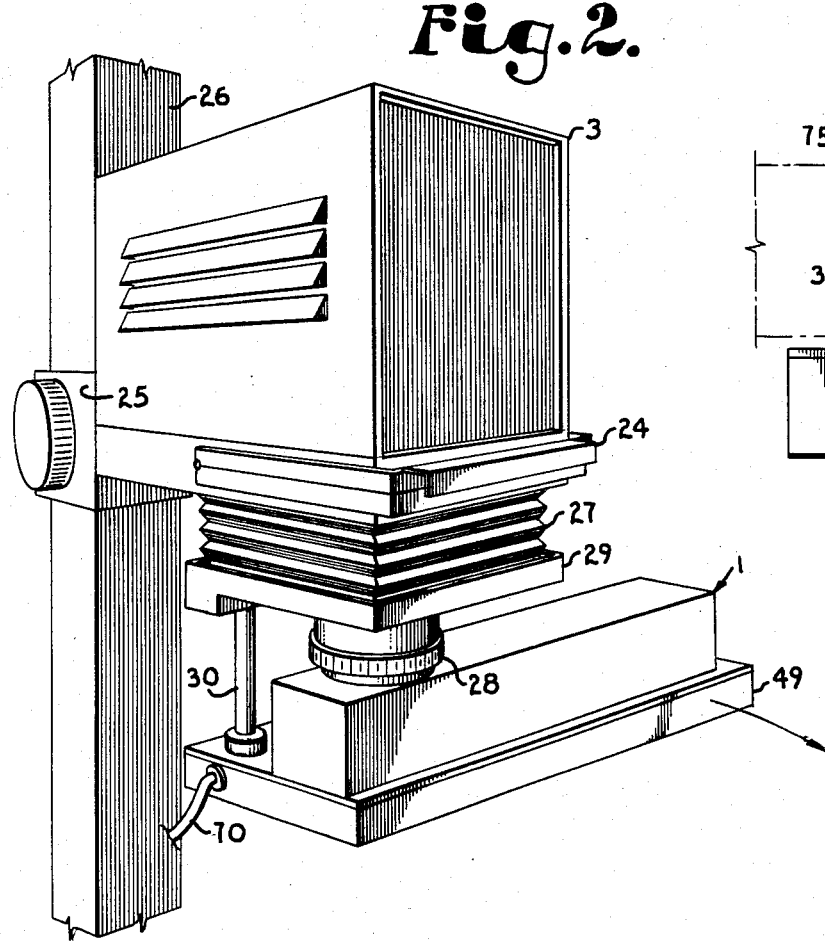
FIG. 2 is a perspective view of the integrator shown mounted on an enlarger.
Figure 3:
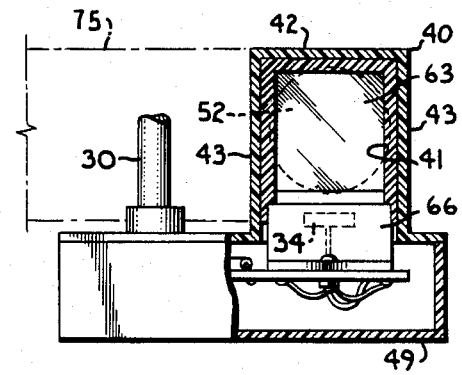
FIG. 3 is an enlarged, end elevational view of the enlarger with portions broken away to reveal internal construction.
Figure 4:
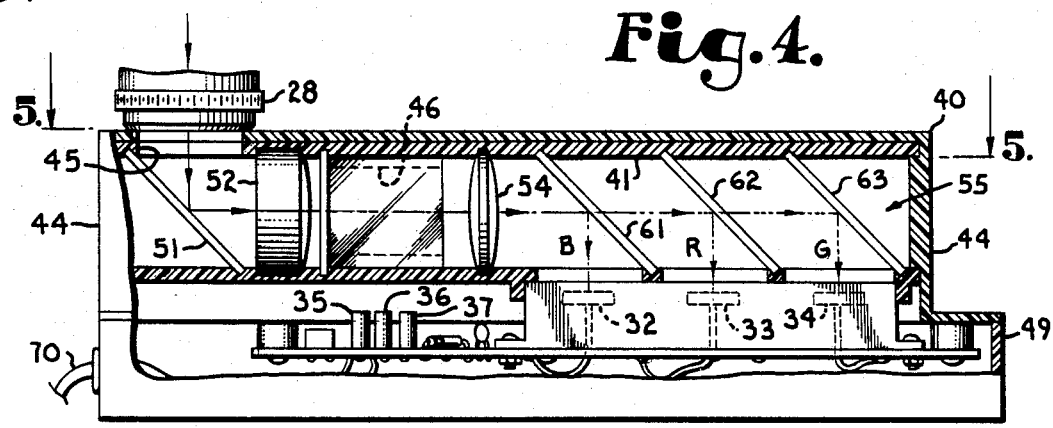
FIG. 4 is a side elevational view of the enlarger with portions broken away to reveal internal construction.
Figure 5:
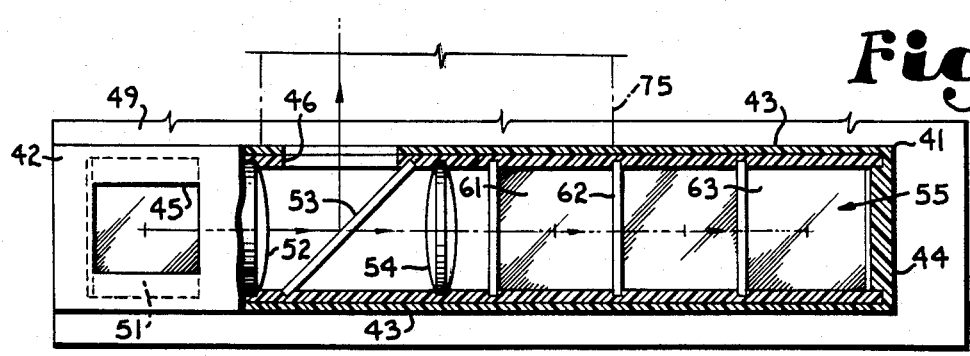
FIG. 5 is a horizontal cross-sectional plan view of the enlarger taken generally along line 5—5 in FIG. 4.

Referring to FIG. 2, the enlarger 2 is of a conventional type with a body 25 vertically movably mounted on a column 26 and having a bellows 27 for minute adjustment of a lens 28, whereby an image may be focused on photographic print paper positioned therebelow (not shown). The additive type light source 3 is mounted on the enlarger body 25 and projects light through a negative (not shown) positioned in a negative carrier 24 and thence through the lens 28 to the print paper. The printing light from the lens 28 is totally unfocused, collimated, and concentrated, with a relatively high intensity in a small cross-sectional area. Also, the total content of the photographic film 7 to be printed is contained within the printing illumination from the lens 28.

An arm 30 depends downwardly from and is attached to a lens housing 29. The arm 30 is movable with the lens housing 29 as the enlarger bellows 27 is minutely adjusted in focusing.

The integrator 1 includes a housing 40 with a light tube 41 formed by top, side and end panels 42, 43 and 44 respectively. The light tube 41 is open at a printing illumination window 45 through its top panel 42 and a classifier window 46 through a side panel 43. The housing 40 also includes a base 49 integrally formed with and open to the light tube 41.

The light tube 41 defines a linear optical path for the printing illumination therealong. Positioned below the printing illumination window and angularly disposed relative to the optical path is a printing illumination mirror 51. Printing illumination from the enlarger lens 28 enters the light tube 41 at a substantially normal direction to its top panel 42 and is deflected by the printing illumination mirror 51 in a direction along the optical path through the light tube 41. Then the printing illumination passes through a first lens whereat it is collimated into a beam.

Next, the printing illumination encounters a classifier spectular (mirror) filter 53 which is also angularly disposed with respect to the optical path. The classifier spectular filter 53 diverts a portion of the printing illumination outwardly from the light tube 41 through a classifier window 46 in a direction substantially normal to the side panel 43 and passes a portion along to a second lens 54, whereat the remaining printing illumination is collimated into a relatively strong beam. At this point, the beam includes an aggregate of the chromatic values found in the printing illumination, i.e., uncorrected light directly from the photographic film 7.

A color separator 55 is then employed to spectrally separate the beam. The color separator 55 comprises first and second color separation filters 61 and 62 respectively positioned within the light tube 41 and disposed at forty-five degree angles to the optical path of the beam. The color separation filters 61 and 62 are dichroic and separate a predetermined primary color from a light beam striking them at approximately a forty-five degree angle. They are available from Optical Coating Laboratory, Inc. of Santa Rosa, Calif.

The first color separation filter 61 deflects light from the beam corresponding to the primary color blue and in a corresponding spectral range downwardly in a direction substantially normal to the optical path of the beam, whereby the beam thereafter comprises yellow light. The second filter 62 filters out the light corresponding to the primary color red, deflects it downwardly, and transmits the beam along its original optical path comprising green light.

An end mirror 63 is positioned within the light tube 41 and angularly disposed with respect to the beam optical path adjacent the light tube end 44. The end mirror 63 deflects the remaining light (green) of the beam downwardly in a direction substantially normal to its original optical path.

The first, second and third photocells 32, 33 and 34 respectively are positioned in the housing base 49 directly below the first and second filters 61 and 62 and the end mirror 63 respectively. The photocells 32, 33 and 34 respectively receive the deflected light corresponding to the blue, red and green primary colors. The photocells 32, 33 and 34 preferably comprise solid state light sensitive photocells with a substantially linear response, a sufficient amplitude of response to be significantly above the noise level, and a stability of response with respect to usual ambient conditions. Although photocells 32, 33 and 34 are shown, a variety of suitable phototransducer devices may be employed with the present invention. Infrared filters (not shown) for screening infrared radiation in the spectral band to which the photocells 32, 33 and 34 respond are mounted thereover.

The output of the photocells 32, 33 and 34 is amplified by the amplifiers 35, 36 and 37 positioned within the housing base 49.

An electrical cable 70 operably connects the amplifiers 35, 36 and 37 with the analog to digital converter 12 from which the signals corresponding to the intensity of light of the primary colors are fed to the computer 4. If desired, these converted signals may be displayed as numeric values on the display 6, or may be merely responded to by the computer 4 in making the necessary corrections.

An output from each amplifier of approximately five volts maximum has been found to be compatible with the computer 4. The gain of each amplifier circuit is set at approximately five volts when film base is placed in the negative carrier 24 and printing illumination passing therethrough is fed to the integrator 1.

A classifier 75 is mounted on the integrator housing 40 and receives that portion of the printing illumination diverted by the classifier spectular filter 53 outwardly through the classifier window 46. The computer can then analyze readings taken at predetermined positions (i.e. a grid pattern) over the entire image and adjust the printing process to obtain proper exposure. For example, the same subject against different backgrounds can produce different contrasts (density) patterns and values, and the computer 4 can be programmed to respond to these whereby the subject of either photograph will be printed with a similar exposure, regardless of background.

In use, the integrator housing 40 is pivotally mounted on the arm 30 and is movable between a sample position whereat printing illumination from the lens 28 enters the printing illumination window 45 and a position to the side of the lens 28 and clear of the printing illumination. Thus, an operator can readily sample the spectral content of the photographic film 7 to be printed, and the digital computer 4 will automatically make the necessary corrections in the printing light by adjusting illumination levels of the blue, red and green lamps (not shown) in the light source 3. The integrator 1 is then easily swung away from its sampling position whereby the printing paper (not shown) may be exposed to the corrected printing illumination.

Figure 6:
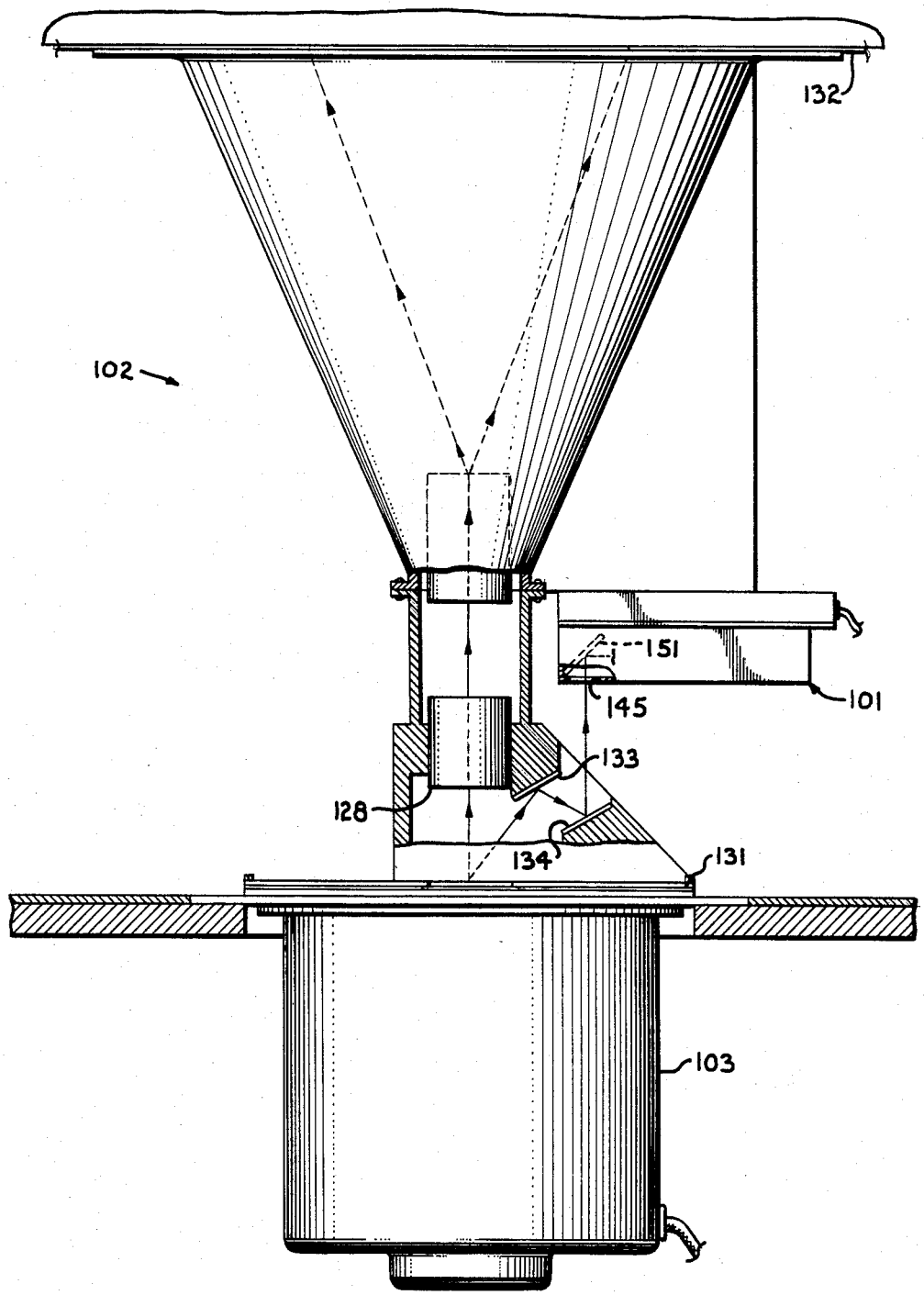
FIG. 6 is a side elevational view of the modified embodiment of the integrator mounted on a color printer.

An integrator comprising a modified embodiment of the present invention is shown in FIG. 6 and generally designated by the reference numeral 101. The integrator 101 is mounted adjacent a printer 102 with a lens 128. A negative carrier 131 is provided for receiving processed photographic film and positions them over a light source 103 for projection to the printer lens 128. The printer lens 128 is typically positioned at a predetermined height above the photograhic film and below photographic print paper 132, whereby prints of a predetermined size are made from negatives of a given size.

A first printing illumination mirror 133 is mounted adjacent the lens 128 and tilted slightly from the horizontal, whereby an image of the illuminated photographic film is projected outwardly. A second printing illumination mirror 134 receives the image from the first printing illumination mirror 133 and reflects it upwardly to a printing illumination mirror 151 corresponding to the printing illumination mirror 51 of the integrator 1. The integrator 101 may be mounted on the printer 102 in an inverted position, whereby its printing illumination window 145 opens downwardly toward the second printing illumination mirror 134. The integrator 101 is otherwise substantially identical to the integrator 1 and functions in the same manner, except that it need not be movably mounted, as the first printing illumination mirror 133 is clear of the projection from the negative to the printer lens 128.

The integrator 101 is thus particularly well adapted for use in printer applications where the available space between the lens 128 and the negative carrier 131 is relatively small because no part of it or the mirrors 133 and 134 occupies this space. For example, making large prints (e.g. eight inches by ten inches) from eleven millimeter negatives necessitates lowering the printer lens 128 very close to the negative carrier 131. In commercial applications of printers such as that shown at 102, the positions of the photographic film, lens 128 and the printing paper 132 are normally fixed relative to each other for any given run of prints, thus requiring no further adjustment. Another particular advantage of the integrator 101, as with the integrator 1, is that substantially an entire exposure on photographic film is analyzed and its spectral composition values fed to the computer 4 for correcting the printing illumination, whereby a particularly life-like and pleasing color print may be produced for the entire photograph.

It will be appreciated that a density classifier, such as that shown at 75, may be employed with the integrator 101. Similarly, various arrangements of printing illumination mirrors may be utilized to transmit an image of the illuminated photographic film to the integrator 101.

It is to be understood that while certain forms of the present invention have been illustrated and described herein, it is not to be limited to the specific forms or arrangement of parts described and shown.

What is claimed and desired to secure by Letters Patent is:

1. An integrator for analyzing the spectral content of printing illumination, which comprises:
    (a) a lens for collimating said printing illumination into a beam;
    (b) color separation means for spectrally separating said beam;
    (c) a plurality of phototransducers each receiving a respective color from said color separation means and providing a signal representative of the intensity of said color;
    (d) a density classifier; and
    (e) a classifier specular filter angularly disposed in the optical path of said beam and diverting a portion of said beam to said density classifier.

2. The integrator according to claim 1 which includes:
    (a) said phototransducers comprising a first, a second and a third phototransducer;
    (b) said color separation means comprising a first and a second color separation filter each being angularly disposed to the optical path of said beam and diverting a respective color therefrom to a respective phototransducer; and
    (c) an end mirror receiving said beam comprising a color from said color separation filters and reflecting said third color to said third phototransducer;
    (d) said first and second color separation filters and said end mirror being linearly aligned along the optical path of said beam.

3. An integrator for analyzing the spectral content of printing illumination, which comprises:
    (a) a first color separation filter for diverting a first color from an optical path of the printing illumination;
    (b) a second color separation filter receiving said printing illumination from said first color separation filter and diverting a second color from said optical path;
    (c) a first phototransducer receiving said first color and providing a signal representative of the intensity thereof;
    (d) a second phototransducer receiving said second color and providing a signal representative of the intensity thereof;
    (d) a third phototransducer receiving a third color passing through said second color separation filter and providing a signal representative of the intensity thereof;
    (f) a density classifier; and
    (g) a specular filter angularly disposed in the optical path of said printing illumination and diverting a portion thereof to said density classifier.

4. The integrator according to claim 3 which includes:
    (a) a lens for collimating said printing illumination into a beam.

5. The integrator according to claim 3 which includes:
    (a) said first, second and third phototransducers comprising first, second and third photocells; and
    (b) first, second and third amplifiers each amplifying the signal from a respective photocell.

6. An integrator for analyzing the spectral content of printing illumination from one of an enlarger and a printer, which comprises:
    (a) a housing mounted in proximity to said one of said enlarger and said printer;
    (b) a lens in said housing collimating said printing illumination into a beam;
    (c) a first color separation filter in said housing angularly disposed to the optical path of said beam and diverting a first color from said beam;
    (d) a second color separation filter in said housing angularly disposed to said optical path and receiving said beam from said first color separation filter, said second color separation filter diverting a second color from said beam;
    (e) a first phototransducer receiving said first color and providing a signal representative of the intensity thereof;
    (f) a second phototransducer receiving light from the second color separation filter and providing a signal representative of the intensity thereof;
    (g) a third phototransducer receiving a third color passing through said second color separation filter, said third phototransducer providing a signal representative of the intensity of said third color;
    (h) a classifier specular filter positioned in said housing before said first color separation filter and angularly disposed to said optical path for diverting a portion of said beam; and
    (i) a density classifier receiving said portion of said beam diverted by said classifier specular filter.

7. The integrator according to claim 6 wherein:
    (a) said lens and said first and second filters are linearly aligned in said housing.

8. The integrator according to claim 6 which includes:
(a) an end mirror angularly disposed in said optical path and deflecting light passing through said first and second color separation filters to said third phototransducer.

9. The integrator according to claim 6 which includes:
(a) said lens comprising a first lens and being positioned in said optical path before said classifier specular filter; and
(b) a second lens positioned between said classifier specular filter and said first color separation filter along said optical path.

10. The integrator according to claim 6 which includes:
(a) mounting means for mounting said housing on said enlarger adjacent a lens of said enlarger, said housing being movable relative to said enlarger lens.

11. The integrator according to claim 10 which includes:
(a) said mounting means movably mounting said housing between a first position receiving said printing illumination from said enlarger lens and a second position clear of said printing illumination.

12. The integrator according to claim 11 wherein:
(a) said mounting means comprises an arm attached to and extending from said enlarger and movable with said enlarger lens;
(b) said housing being pivotally attached to said arm.

13. The integrator according to claim 6 which includes:
(a) a printing illumination mirror being positioned adjacent a lens of said printer and adapted for transmitting said printing illumination from substantially an entire photographic film exposure to said housing.

14. The integrator according to claim 6 which includes:
(a) said first, second and third phototransducers comprising first, second and third photocells; and
(b) first, second and third amplifiers for amplifying the respective signals of said first, second and third photocells.

15. The integrator according to claim 6 which includes:
(a) a printing illumination mirror in said housing and angularly disposed to said optical path, said printing illumination mirror transmitting said printing illumination to said lens.

16. An integrator for analyzing the spectral content of printing illumination from a lens of an enlarger, which comprises:
(a) a housing having a printing illumination window therein;
(b) mounting means mounting said housing on said enlarger, said housing being movable between a sample position with said printing illumination window receiving said printing illumination and a clear position clear of said printing illumination;
(c) a printing illumination mirror in said housing reflecting said printing illumination;
(d) a lens collimating said printing illumination into a beam;
(e) a first color separation filter angularly disposed to the optical path of said beam and diverting a first color from said beam;
(f) a second color separation filter angularly disposed to said optical path and diverting a second color from said beam;
(g) an end mirror angularly disposed to said optical path and reflecting a third color;
(h) said printing illumination mirror, said lens, said first and second color separation filters and said end mirror being linearly aligned along said optical path;
(i) a first photocell receiving said first color and providing a signal representative of its intensity;
(j) a second photocell receiving said second color and providing a signal representative of its intensity;
(k) a third photocell receiving said third color and provding a signal representative of its intensity;
(l) first, second and third amplifiers amplifying the signals from said first, second and third photocells respectively;
(m) a density classifier; and
(n) a specular filter angularly disposed in said optical path before first color separation filter and diverting a portion of said beam to said density classifier.

17. The integrator according to claim 16 which includes:
(a) said lens comprising a first lens and being positioned between said printing illumination mirror and said specular filter; and
(b) a second lens positioned between said specular filter and first color separation filter.

18. An integrator for analyzing the spectral content of printing illumination from photographic film in a printer, which comprises:
(a) a housing having a printing illumination window therein;
(b) mounting means mounting said housing on said printer;
(c) printing illumination mirror means mounted on said printer and reflecting a substantially total image of an exposure on said photographic film to said housing;
(d) a lens collimating said printing illumination into a beam;
(e) a first color separation filter angularly disposed to the optical path of said beam and diverting a first color from said beam;
(f) a second color sepration filter angularly disposed in said optical path and diverting a second color from said beam;
(g) an end mirror angularly disposed to said optical path and reflecting a third color;
(h) said lens, said first and second color separation filters and said end mirror being linearly aligned along said optical path;
(i) a first photocell receiving said first color and providing a signal representative of its intensity;
(j) a second photocell receiving said second color and providing a signal representative of its intensity;
(k) a third photocell receiving said third color and providing a signal representative of its intensity;
(l) first, second and third amplifiers amplifying the signals from said first, second and third photocells respectively;
(m) a density classifier; and
(n) a specular filter angularly disposed in said optical path before said first color separtion filter and diverting a portion of said beam to said density classifier.

19. The integrator according to claim 18 which includes:
(a) said printing illumination mirror means comprising:
   (1) a first printing illumination mirror positioned adjacent a lens of said printer and reflecting an image of said exposure; and
   (2) a second printing illumination mirror mounted on said printer and reflecting said image from said first printing illumination mirror to said housing.

20. An integrator for analyzing the spectral content of a beam of printing illumination from a film transparency in a printer or an enlarger with a lens, which comprises:
(a) a housing having a printing illumination window;
(b) means for mounting said housing on said printer or enlarger with said housing rotatably movable between a sample position with said window aligned with and in close proximity to said lens and adapted to receive substantially all of the printing illumination unfocused from said transparency and a clear position clear of said printing illumination;
(c) a first color separation filter in said housing angularly disposed in an optical path of said printing illumination in said housing and diverting a first color therefrom;
(d) a second color separation filter in said housing angularly disposed in said optical path and diverting a second color from said printing illumination;
(e) an end mirror in said housing angularly disposed in said optical path and reflecting a third color remaining in said printing illumination;
(f) said first and second color separation filters and said end mirror being linearly aligned along said optical path of said printing illumination within said housing;
(g) a first photocell positioned adjacent said optical path and receiving said first color from said first color separation filter;
(h) a second photocell positioned adjacent said optical path and receiving said second color from said second color separation filter;
(i) a third photocell positioned adjacent said optical path and receiving said third color from said end mirror; and
(j) first, second and third amplifiers mounted in said housing and amplifying signals from said first, second and third photocells respectively, said amplifier signals representing the intensity of said corresponding colors in said printing illumination.

21. The integrator according to claim 20 wherein:
(a) said mounting means comprises an arm extending from said printer or enlarger in a direction substantially parallel to said optical path of said printing illumination;
(b) said arm is journaled in said housing whereby said housing is rotatable about an axis extending longitudinally through said arm in a direction substantially parallel to said optical path of said printing illumination.

22. In a printing illumination system including a digital computer; a digital to analog converter for converting digital signals from said computer to analog signals; a power source; first, second and third power controls operably connected to said power source and to said digital to analog converter, a light source including first, second and third lamps corresponding to first, second and third colors respectively, the outputs of which are controlled by said first, second and third power controls; an enlarger or printer for photographic transparencies including a lens and receiving printing illumination from said light source; and an analog to digital converter for communicating digital signals to said computer; the improvement of an integrator for spectral illumination, which comprises:
(a) a housing having a printing illumination window;
(b) means for mounting said housing on said enlarger or printer movable between a sample position with said window in proximity to and adapted to receive substantially all of the printing illumination unfocused from said lens and a clear position clear of said printing illumination;
(c) a first color separation filter in said housing angularly disposed in an optical path of said printing illumination therein and diverting a first color therefrom;
(d) a second color separation filter in said housing angularly disposed in said optical path and diverting a second color from said printing illumination;
(e) an end mirror in said housing angularly disposed in said optical path and reflecting a third color;
(f) a first photocell in said housing receiving said first color;
(g) a second photocell in said housing receiving said second color;
(k) a third photocell in said housing receiving said third color; and
(l) first, second and third amplifiers in said housing connected to said first, second and third photocells respectively and providing analog signals representing the intensity of said respective colors to said analog to digital converter.

23. The integrator according to claim 22 wherein:
(a) said mounting means comprises an arm extending from said printer or enlarger in a direction substantially parallel to said optical path of said printing illumination;
(b) said arm is journaled in said housing whereby said housing is rotatable about an axis extending longitudinally through said arm in a direction substantially parallel to said optical path of said printing illumination.

24. The integrator according to claim 22 wherein:
(a) said computer automatically adjusts the power input to said first, second and third lamps in response to said analog signals from said first, second and third amplifiers respectively.

* * * * *